United States Patent
Yu et al.

(10) Patent No.: US 11,890,902 B2
(45) Date of Patent: Feb. 6, 2024

(54) DUPLEX BLUETOOTH TRANSMISSION TIRE PRESSURE DETECTING SYSTEM AND THE METHOD

(71) Applicants: Chih-Wei Yu, Taipei (TW); Shih-Yao Lin, Taipei (TW)

(72) Inventors: Chih-Wei Yu, Taipei (TW); Shih-Yao Lin, Taipei (TW)

(73) Assignee: SYSGRATION LTD., Taipei (TW)

( * ) Notice: Subject to any disclaimer, the term of this patent is extended or adjusted under 35 U.S.C. 154(b) by 72 days.

(21) Appl. No.: 17/872,010

(22) Filed: Jul. 25, 2022

(65) Prior Publication Data

US 2023/0030430 A1 Feb. 2, 2023

(30) Foreign Application Priority Data

Jul. 30, 2021 (TW) .................................. 110128009

(51) Int. Cl.
  *B60C 23/04* (2006.01)
  *H01Q 1/22* (2006.01)
  *H04W 4/80* (2018.01)

(52) U.S. Cl.
  CPC ........ *B60C 23/0481* (2013.01); *B60C 23/041* (2013.01); *B60C 23/0459* (2013.01); *H01Q 1/2241* (2013.01); *H01Q 1/2291* (2013.01); *H04W 4/80* (2018.02)

(58) Field of Classification Search
  CPC .............. B60C 23/0481; B60C 23/041; B60C 23/0459; B60C 23/0408; B60C 23/0416; B60C 23/04; B60C 23/0489; H01Q 1/2241; H01Q 1/2291; H04W 4/80
  See application file for complete search history.

(56) References Cited

U.S. PATENT DOCUMENTS

| | | | |
|---|---|---|---|
| 6,445,287 B1 * | 9/2002 | Schofield | B60C 23/00 340/447 |
| 9,950,577 B1 * | 4/2018 | Marlett | H04W 4/40 |
| 11,592,355 B2 * | 2/2023 | Vlahakis | G01H 11/06 |
| 11,734,652 B2 * | 8/2023 | Hsu | G06Q 30/0633 705/26.8 |
| 2006/0208865 A1 * | 9/2006 | Quach | B60C 23/009 340/447 |
| 2011/0215921 A1 * | 9/2011 | Ben Ayed | H04W 12/06 340/539.11 |
| 2013/0061456 A1 * | 3/2013 | Lefaure | B60C 23/0408 29/595 |
| 2016/0075175 A1 * | 3/2016 | Biderman | B60L 7/00 301/6.5 |
| 2016/0082772 A1 * | 3/2016 | Biderman | B60K 7/00 301/6.5 |

(Continued)

FOREIGN PATENT DOCUMENTS

EP 1172236 A2 * 1/2002 ......... B60C 23/0401

*Primary Examiner* — Chico A Foxx

(57) ABSTRACT

A duplex Bluetooth transmission tire pressure system and a method thereof are provided. The system includes a Bluetooth tire pressure detector and a transceiver host, and the two can duplex Bluetooth transmit to each other, so that to complete locating and tire condition detecting. The transceiver host controls a locating program that controls the Bluetooth tire pressure detector to start or stop and limit the transmitting packet of the tire condition program of the Bluetooth tire pressure detector.

9 Claims, 6 Drawing Sheets

(56) References Cited

U.S. PATENT DOCUMENTS

| | | | | |
|---|---|---|---|---|
| 2016/0096403 A1* | 4/2016 | Huang | ............... | B60C 23/0483 |
| | | | | 701/34.4 |
| 2016/0325592 A1* | 11/2016 | Tomakidi | ............ | B60C 23/0471 |
| 2020/0114753 A1* | 4/2020 | Biderman | ................ | H02P 6/08 |
| 2021/0129601 A1* | 5/2021 | Ferry | ...................... | G01L 17/00 |
| 2021/0245559 A1* | 8/2021 | Boisset | .............. | B60C 23/0454 |
| 2021/0339583 A1* | 11/2021 | Regef | ................ | B60C 23/0461 |
| 2022/0324272 A1* | 10/2022 | Fu | ...................... | B60C 23/0444 |
| 2022/0332152 A1* | 10/2022 | Fu | ...................... | B60C 23/0437 |
| 2023/0072393 A1* | 3/2023 | Chen | .................. | B60C 23/0479 |
| 2023/0241933 A1* | 8/2023 | Strahan | .............. | B60C 23/0427 |
| | | | | 340/447 |

* cited by examiner

DUPLEX BLUETOOTH TRANSMISSION TIRE PRESSURE DETECTING SYSTEM AND THE METHOD

CROSS-REFERENCE TO RELATED PATENT APPLICATION

This application claims the benefit of priority to Taiwan Patent Application No. 110128009 filed on 30 Jul. 2021. The entire content of the above identified application is incorporated herein by reference.

FIELD OF THE DISCLOSURE

The present disclosure relates to a tire pressure detecting system for vehicles, and more particularly to a duplex communication between a Bluetooth tire pressure detector and a transceiver host to complete positioning and tire condition detection.

BACKGROUND OF THE DISCLOSURE

The automatic positioning technology of the tire pressure detector means that the transceiver host in the car can receive the signal and automatically determine the position of the tire pressure detector through the tire speed, rotation phase angle, or signal strength. Some tire pressure detectors configured by car manufacturers can automatically locate each time the vehicle is stopped. However, some tire pressure detectors must be removed from the tire and replaced with a new product or be calibrated when the tire pressure detector is out of action due to insufficient power, or during routine maintenance, such as tire rotation for average wear, or tire replacement. Once the locating between the tire pressure detector and the transceiver host is completed, the tire pressure detector simplex transmits the temperature and pressure to the transceiver host, so that the transceiver host can obtain the tire condition.

The conventional automatic locating technology of the tire pressure detector is one-way data transmission from the tire pressure detector (as shown in FIG. 6). Generally, the tire pressure detector transmits the locating data would cost about 10 minutes. The positioning calculation of the tire pressure detector is very power-consuming, and has the following effects:

1. Even if the transceiver host has complete locating with the tire pressure detector, the tire pressure detector will continue to transmit the locating data to the transceiver host.

2. After the tire pressure detector and the transceiver host complete the locating, every time the vehicle stops temporarily for more than 10 minutes and restarts, the tire pressure detector will transmit the locating data again, thus wasting time transmitting the locating data.

3. Due to the general tire pressure detector transmitting the locating data for 10 minutes at a fixed time, the transceiver host cannot receive continuous valid data when there is an error or interruption in the locating data received by the transceiver host. As a result, the tire pressure detector can re-transmit the locating data again only when the vehicle is stopped and turned off for restart.

SUMMARY OF THE DISCLOSURE

The present disclosure provides a duplex Bluetooth transmission tire pressure system, wherein a Bluetooth tire pressure detector and a transceiver host provide a duplex signal transition to complete locating and tire condition detection, as well as to improve the problems of conventional technology.

In one aspect, to achieve the objective and effort mentioned above, the present disclosure provides a duplex Bluetooth transmission tire pressure system comprising a transceiver host and a plural of Bluetooth tire pressure detectors. In which, the transceiver host includes a processing unit, a host Bluetooth transceiver unit and a transceiver host antenna. The host Bluetooth transceiver unit is electrically connected to the processing unit and the transceiver host antenna. Further, each of the Bluetooth tire pressure detectors includes a battery, a monitoring module, a control unit, a Bluetooth transceiver unit and a transceiver antenna; in which, the battery is electrically connected to the control unit and the monitoring module, and the control unit electrically connected to the monitoring module, the Bluetooth transceiver unit electrically connected to the control unit and the transceiver antenna. Further, the control unit includes a locating program and a tire condition program, and the data detected by the monitoring module is obtained by the locating program and the tire condition program. Furthermore, the transceiver host antenna of the host Bluetooth transceiver unit and the transceiver antenna of the Bluetooth transceiver unit constitute a duplex Bluetooth packet transmission, and the host Bluetooth transceiver unit of the transceiver host controls the control unit to start or stop the locating program and limit the packet transmission of the tire condition program.

In another aspect, the present disclosure provides a method for duplex Bluetooth detecting tire pressure, comprising: starting a vehicle; a transceiver host transmitting a Bluetooth controlling packet to a Bluetooth tire pressure detector to start a locating program and a tire condition program; the Bluetooth tire pressure detector transmitting the Bluetooth locating packet to the transceiver host; the transceiver host receiving the Bluetooth locating packet till the locating finished; the transceiver host transmitting the Bluetooth controlling packet to the Bluetooth tire pressure detector to stop the locating program and start the tire condition program; the monitoring module of the Bluetooth tire pressure detector detecting the tire rotating and generate a Bluetooth tire condition packet; the Bluetooth tire pressure detector transmitting the Bluetooth tire condition packet to the transceiver host.

In yet another aspect, the present disclosure provides a method for duplex Bluetooth detecting tire pressure, comprising: starting a vehicle; a transceiver host transmitting a Bluetooth controlling packet to a Bluetooth tire pressure detector to start a locating program and a tire condition program; the Bluetooth tire pressure detector detecting the tire rotating and generate a Bluetooth locating packet and a Bluetooth tire condition packet; the Bluetooth tire pressure detector transmitting the Bluetooth locating packet and the Bluetooth tire condition packet to the transceiver host; the transceiver host receiving the Bluetooth locating packet till the locating finished; the transceiver host transmitting a Bluetooth controlling packet to a Bluetooth tire pressure detector to stop a locating program.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

Figure 1:
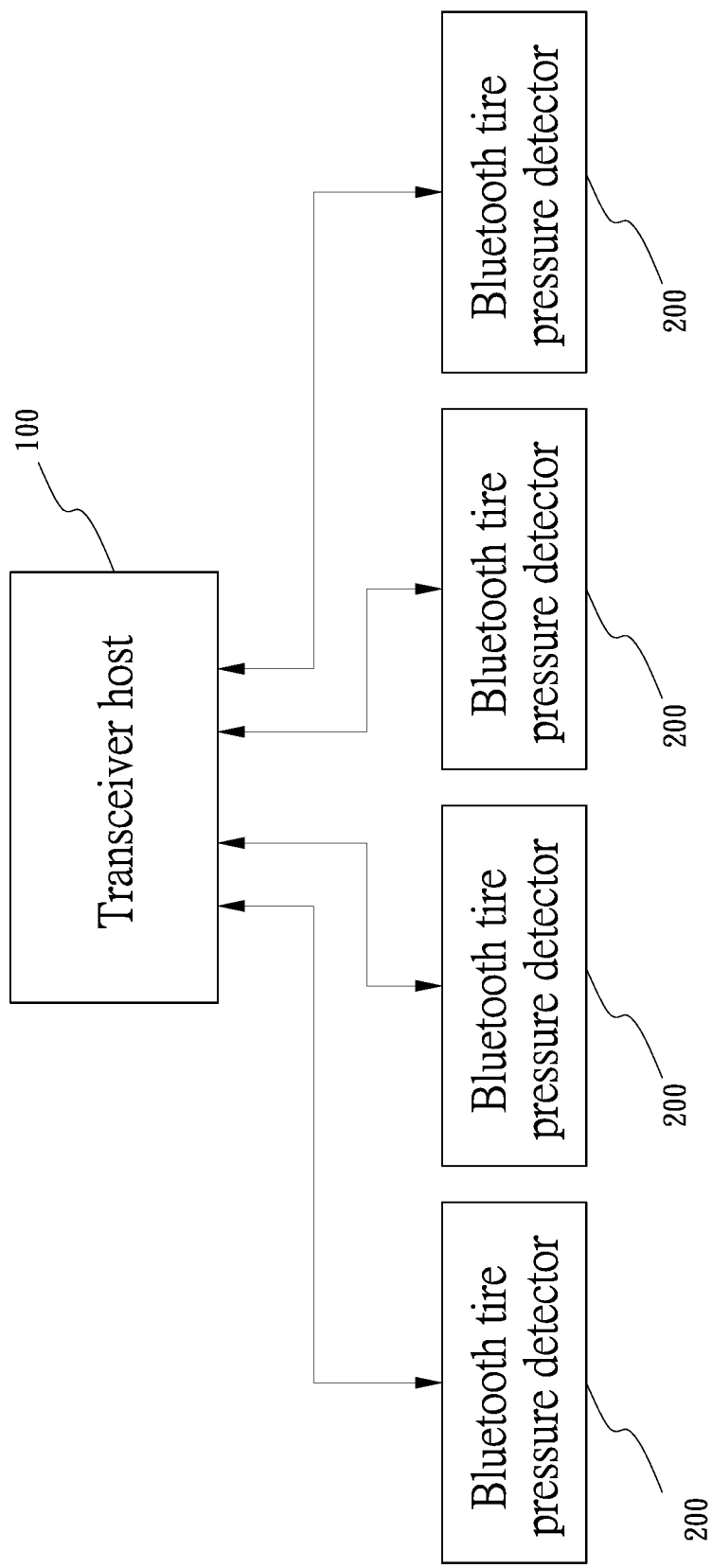
FIG. 1 is a block schematic diagram of a duplex Bluetooth transmission tire pressure system of the present disclosure.
Figure 2:
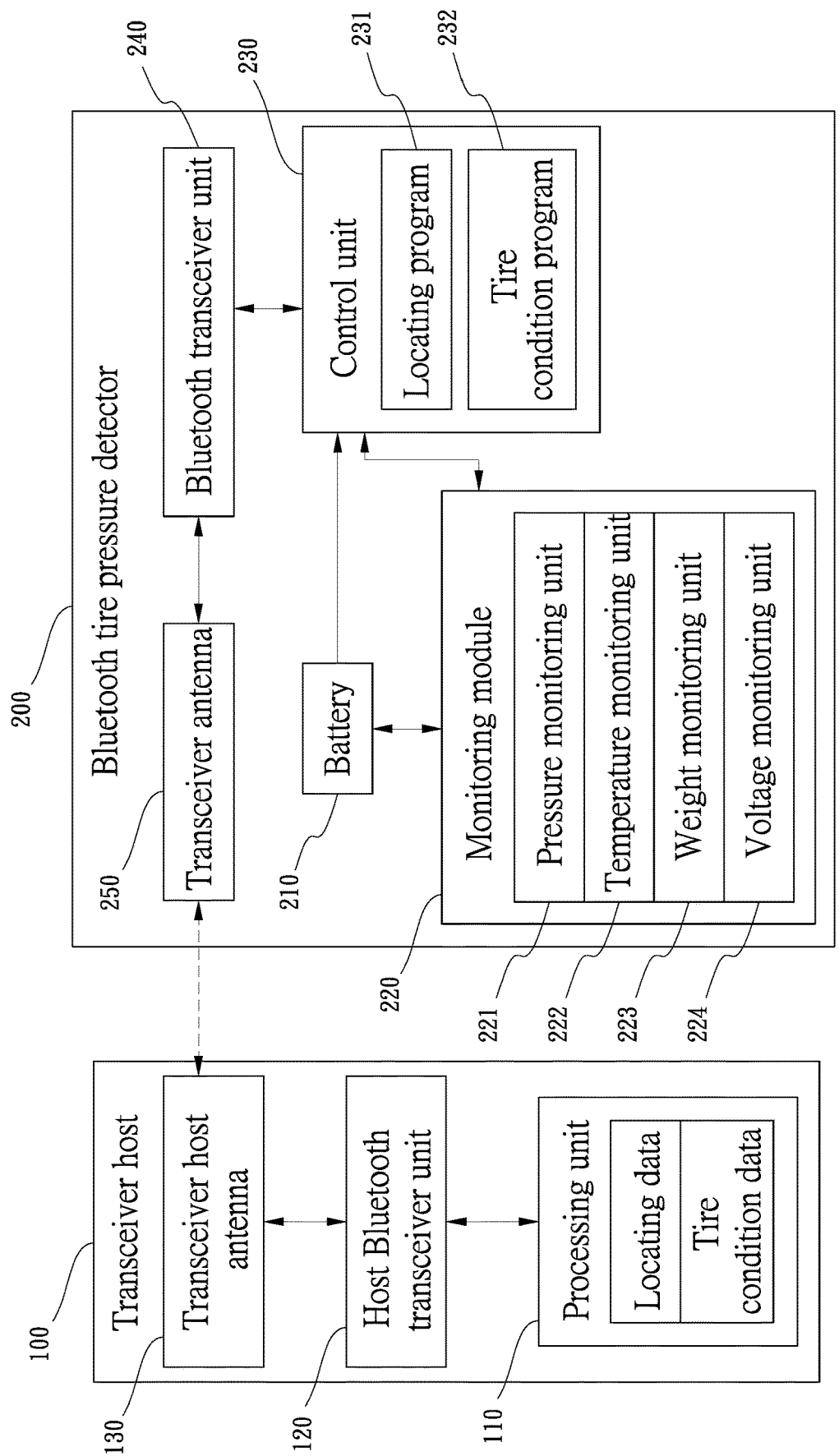
FIG. 2 is a block schematic diagram of operating the duplex Bluetooth transmission tire pressure system of the present disclosure.
Figure 3:
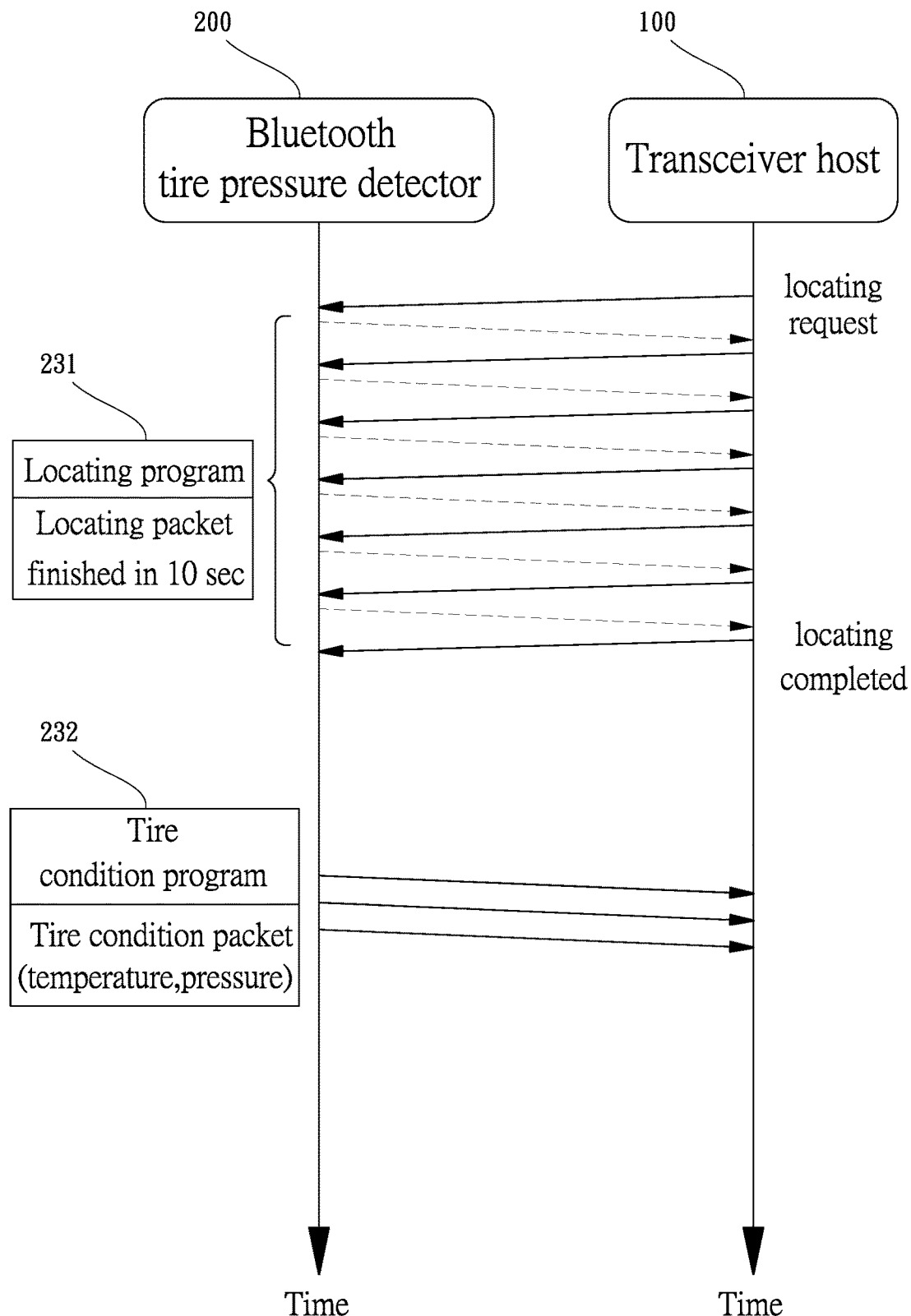
FIG. 3 is a schematic view of the duplex signal transmission between a Bluetooth tire pressure detector and a transceiver host of the present disclosure.

Referring to FIGS. 1-3, the present disclosure provides a duplex Bluetooth transmission tire pressure system, including a transceiver host 100 and a plural of Bluetooth tire pressure detectors 200 (for example, four Bluetooth tire pressure detectors as shown in FIG. 1). The transceiver host 100 includes a processing unit 110, a host Bluetooth transceiver unit 120 and a transceiver host antenna 130. In which, the host Bluetooth transceiver unit 120 is electrically connected to the processing unit 110 and the transceiver host antenna 130. Each of the Bluetooth tire pressure detectors 200 includes a battery 210, a monitoring module 220, a control unit 230, a Bluetooth transceiver unit 240 and a transceiver antenna 250. The battery 210 is electrically connected to the control unit 230 and the monitoring module 220, and the control unit 230 is electrically connected to the monitoring module 220. The Bluetooth transceiver unit 240 is electrically connected to the control unit 230 and the transceiver antenna 250. Further, the control unit 230 includes a locating program 230 and a tire condition program 232. The data detected by the monitoring module 220 is obtained by the locating program 231 and the tire condition program 232. Moreover, the transceiver host antenna 130 of the host Bluetooth transceiver unit 120 and the transceiver antenna 130 of the Bluetooth transceiver unit 240 constitute a duplex Bluetooth packet transmission. The host Bluetooth transceiver unit 120 of the transceiver host 100 controls the control unit 230 to start or stop the locating program 231 and limit the packet transmission of the tire condition program 232.

For example, the transceiver host 100 mentioned above is located inside the vehicle, and the Bluetooth tire pressure detector 200 is mounted on the tire of the vehicle (which can be either an inner side or an outer side). The monitoring module 220 includes a pressure monitoring unit 221, a temperature monitoring unit 222, a gravity monitoring unit 223 and a voltage monitoring unit 224. Through the pressure monitoring unit 221, the temperature monitoring unit 222, and the gravity monitoring unit 223, information for assisting in locating can be detected, such as tire pressure, temperature, acceleration, rotation time, rotation phase, and tire position, etc. In addition, the voltage of the battery 210 can be detected through the voltage monitoring unit 224, so as to prevent the voltage of the battery 210 from being lower than the operating voltage of the monitoring module 220 and the control unit 230, and prevent abnormality or insufficient power in the battery 210.

When the transceiver host 100 controls the control unit 230 by Bluetooth to operate the tire condition program 232 and limit transmitting the data of the monitoring module 220, the control unit 230 transmits the packet to the transceiver host 100 when the data from the monitoring module 220 compared to the default value of tire condition program 232 shows an abnormal state.

It is worth mentioning that, in one embodiment, the transceiver host 100 controls the control unit 230 by Bluetooth to operate the locating program 231 first, and then to operate the tire condition program 232 after the operation of the locating program 232 is finished. The order of the processes is as shown in FIG. 3. In another embodiment, the transceiver host 100 controls the control unit 230 via Bluetooth to operate the locating program 231 and the tire condition program 232 simultaneously.

Figure 4:
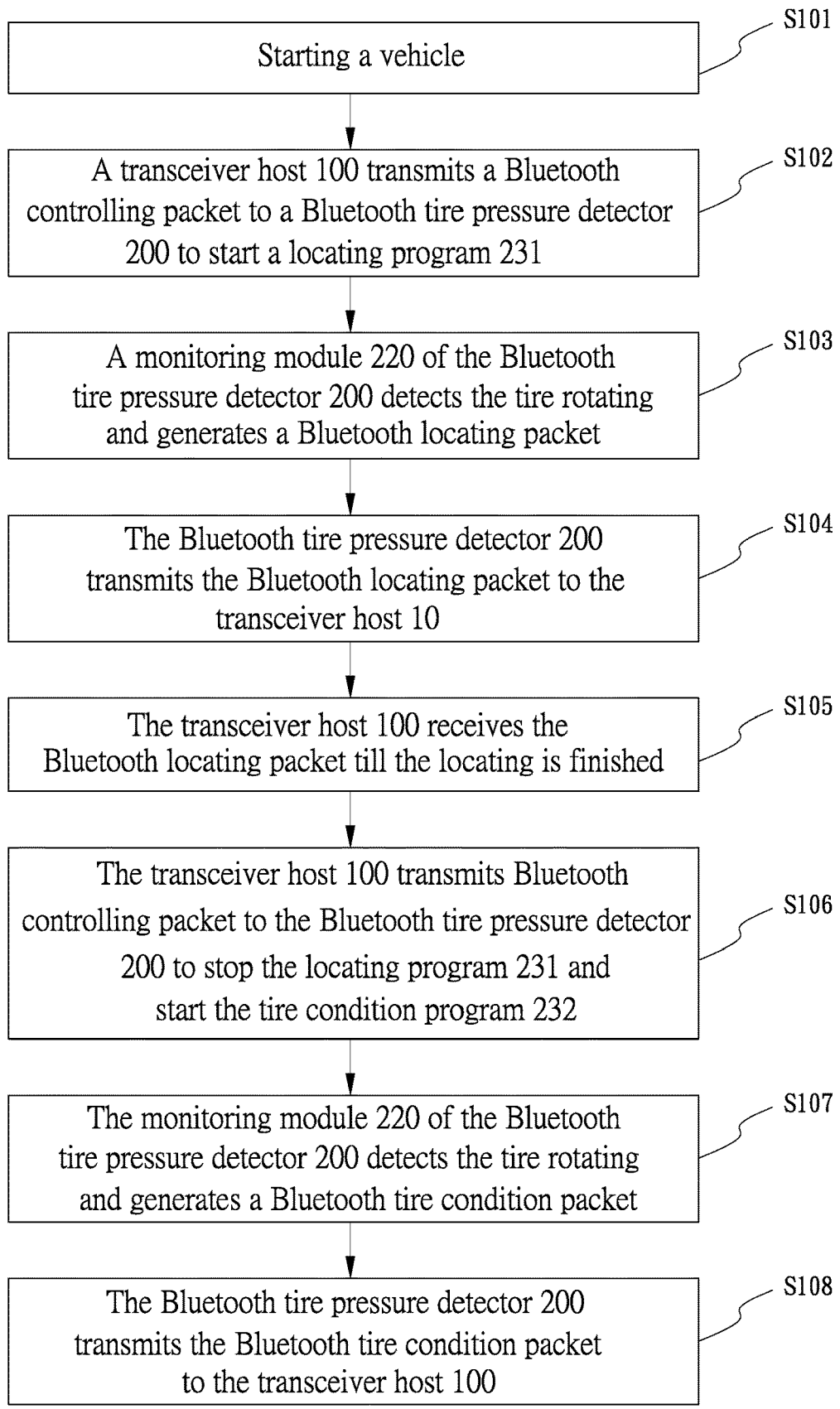
FIG. 4 is a flowchart schematic view of a method for duplex Bluetooth detecting the tire pressure of the present disclosure.

In conjunction with FIG. 4, which is a method for duplex Bluetooth detecting tire pressure, including:

S101: starting a vehicle;

S102: a transceiver host 100 transmits a Bluetooth controlling packet to a Bluetooth tire pressure detector 200 to start a locating program 231;

S103: a monitoring module 220 of the Bluetooth tire pressure detector 200 detects the tire rotating and generates a Bluetooth locating packet;

S104: the Bluetooth tire pressure detector 200 transmits the Bluetooth locating packet to the transceiver host 100;

S105: the transceiver host 100 receives the Bluetooth locating packet till the locating is finished;

S106: the transceiver host 100 transmits Bluetooth controlling packet to the Bluetooth tire pressure detector 200 to stop the locating program 231 and start the tire condition program 232;

S107: the monitoring module 220 of the Bluetooth tire pressure detector 200 detects the tire rotating and generates a Bluetooth tire condition packet; and S108: the Bluetooth tire pressure detector 200 transmits the Bluetooth tire condition packet to the transceiver host 100;

The above-mentioned transmitting the Bluetooth locating packet to the transceiver host 100 is completed within 10 seconds from the beginning to the end, and the locating program 231 is turned off. The above-mentioned transmitting the Bluetooth tire condition packet to the transceiver host 100 is completed within 3 seconds from the beginning to the end, and contentious the tire condition program 232.

When the transceiver host 100 controls the control unit 230 by Bluetooth to operate the tire condition program 232 and limit transmitting the data of the monitoring module 220, the control unit 230 transmits the packet to the transceiver host 100 when the data from the monitoring module 220 compared to the default value of the tire condition program 232 shows an abnormal state.

The Bluetooth tire pressure system of the present disclosure can duplex transmit the packets. According to the needs, the transceiver host 100 controls the Bluetooth tire pressure detector 200 by Bluetooth and operates the tire condition program 231; during this time, the Bluetooth tire pressure detector 200 transmits the Bluetooth locating packet to the transceiver host 100 continuously. When the transceiver host 100 completes the locating of the Bluetooth tire pressure detector 200, the transceiver host 100 transmits a Bluetooth control packet to control the Bluetooth tire pressure detector 200 turning the locating program 231 off and operating the tire condition program 232.

Figure 5:
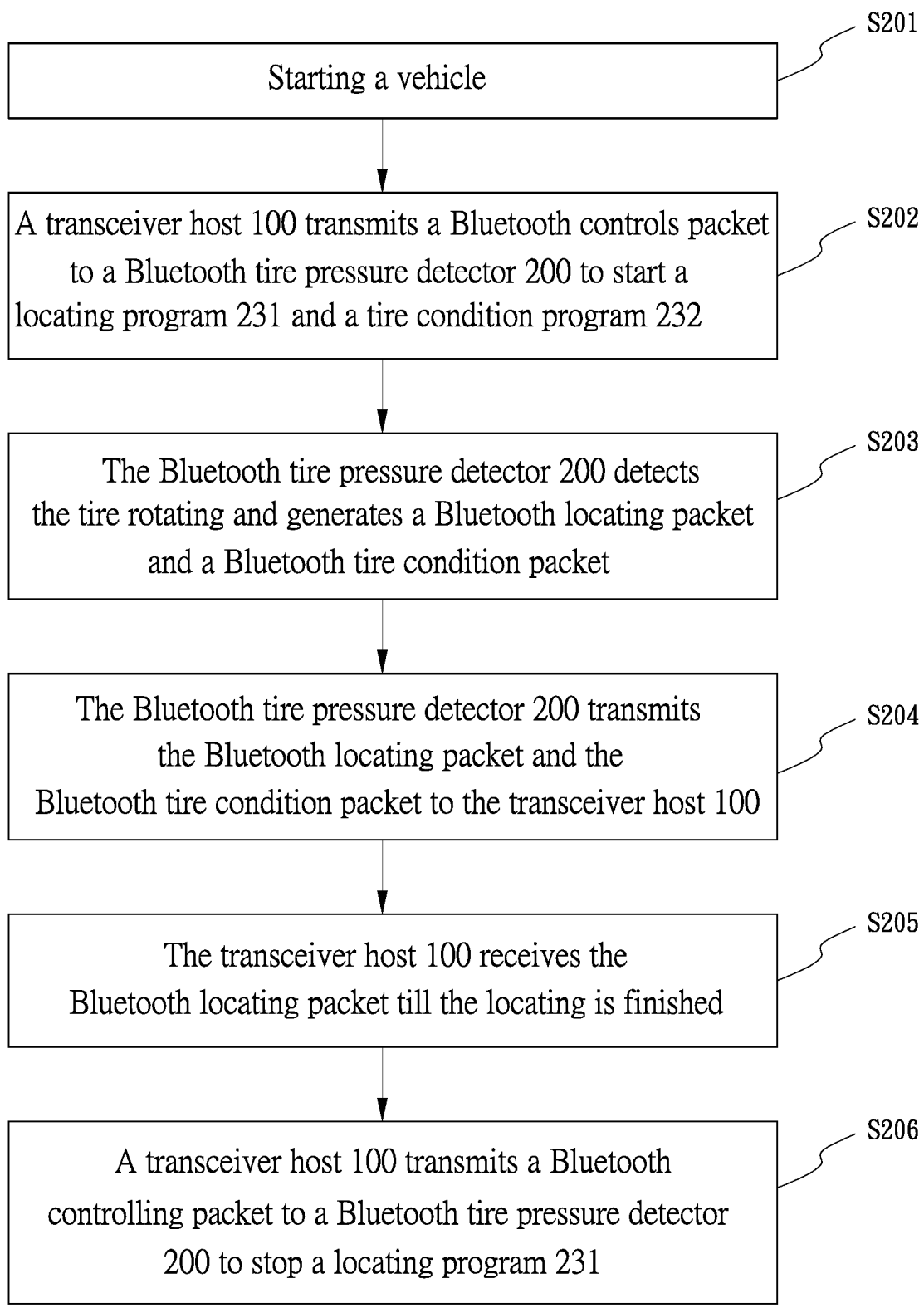
FIG. 5 is a flowchart schematic view of another method for duplex Bluetooth detecting the tire pressure of the present disclosure.
Figure 6:
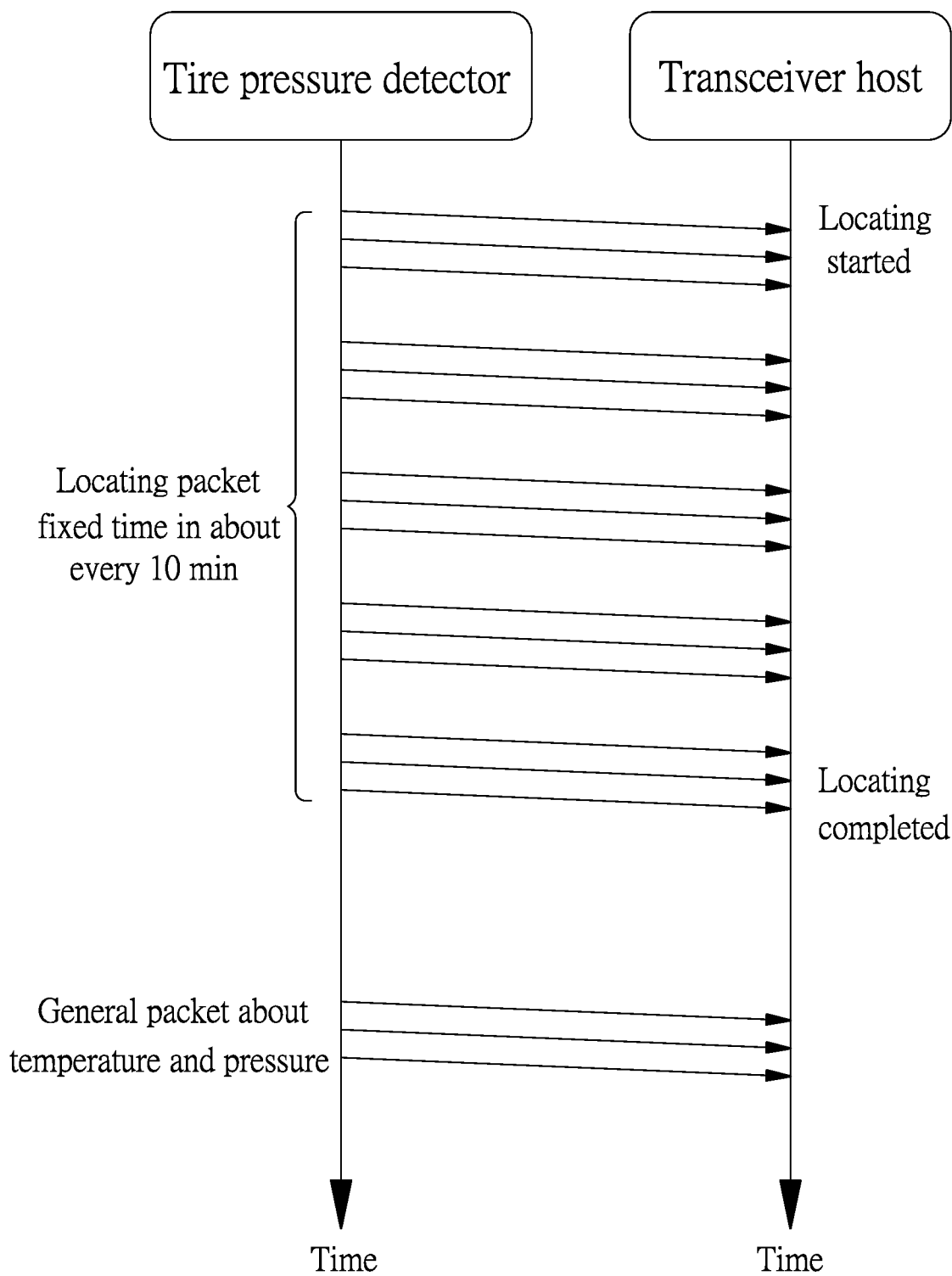
FIG. 6 is a schematic view of a conventional tire pressure detector transmitting the signal to the transceiver host.

In conjunction with FIG. 5, which is a method for duplex Bluetooth detecting tire pressure, including:

S201: starting a vehicle;

S202: a transceiver host 100 transmits a Bluetooth controls packet to a Bluetooth tire pressure detector 200 to start a locating program 231 and a tire condition program 232;

S203: the Bluetooth tire pressure detector 200 detects the tire rotating and generates a Bluetooth locating packet and a Bluetooth tire condition packet;

S204: the Bluetooth tire pressure detector 200 transmits the Bluetooth locating packet and the Bluetooth tire condition packet to the transceiver host 100;

S205: the transceiver host 100 receives the Bluetooth locating packet till the locating is finished;

S206: a transceiver host 100 transmits a Bluetooth controlling packet to a Bluetooth tire pressure detector 200 to stop a locating program 231.

The Bluetooth tire pressure system of the present disclosure can duplex transmit the packets. According to the needs, the transceiver host 100 commands the Bluetooth tire pressure detector 200 by Bluetooth to operate the tire condition program 231 and the tire condition program 232; during this time, the Bluetooth tire pressure detector 200 transmits the Bluetooth locating packet and the Bluetooth tire condition packet to the transceiver host 100 continuously. When the transceiver host 100 completes the locating of the Bluetooth tire pressure detector 200, the transceiver host 100 transmits a Bluetooth control packet to command the Bluetooth tire pressure detector 200 turning the locating program 231 off and keeping operating the tire condition program 232.

Therefore, the duplex Bluetooth transmission tire pressure system/method of the present disclosure has the following advantages:

1. The transceiver host 100 can simultaneously check the data when the Bluetooth locating packet data is received by Bluetooth to ensure whether the Bluetooth locating packet is valid (no errors or interruptions) so that the locating between the Bluetooth tire pressure detector 200 and the transceiver host 100 can be completed in a short time.

2. The Bluetooth tire pressure detector 200 can be controlled by the transceiver host 100 to operate the locating program 231 and the tire condition program 232, and after obtaining the locating data of the Bluetooth tire pressure detector 200, the transceiver host 100 transmits a Bluetooth control packet to the Bluetooth tire pressure detector 200 to continuously operate the tire condition program 232. The Bluetooth tire pressure detector 200 only operates and is controlled by the transceiver host 100 when there is a locating requirement, so that the Bluetooth tire pressure detector 200 will not start automatically even when the vehicle temporarily stops and begins again.

3. Errors in the locating data of the tire pressure detector can be prevented. In the conventional art, the vehicle must be stopped for a period of time before the tire pressure detector re-transmits the locating data to the transceiver host. At the same time, the present disclosure can transmit the locating data again in a short time.

4. Through the above-mentioned operating mechanism, the transceiver host 100 can control the time of the Bluetooth tire pressure detector 200 to operate locating, which saves the time of locating compared with the conventional art; the present disclosure indeed saves the electricity of the Bluetooth tire pressure detector 200 to operate and locate.

What is claimed is:

1. A duplex Bluetooth transmission tire pressure system, comprising a transceiver host and a plural of Bluetooth tire pressure detectors;

wherein the transceiver host includes a processing unit, a host Bluetooth transceiver unit and a transceiver host antenna; wherein the host Bluetooth transceiver unit is electrically connected to the processing unit and the transceiver host antenna;

wherein each of the plural of Bluetooth tire pressure detectors includes a battery, a monitoring module, a control unit, a Bluetooth transceiver unit and a transceiver antenna; wherein the battery is electrically connected to the control unit and the monitoring module, the control unit is electrically connected to the monitoring module, the Bluetooth transceiver unit is electrically connected to the control unit and the transceiver antenna; wherein the control unit includes a locating program and a tire condition program, and the data detected by the monitoring module is obtained by the locating program and the tire condition program;

wherein the transceiver host antenna of the host Bluetooth transceiver unit and the transceiver antenna of the Bluetooth transceiver unit constitute a duplex Bluetooth packet transmission, and the host Bluetooth transceiver unit of the transceiver host controls the control unit to start or stop the locating program and limit the packet transmission of the tire condition program.

2. The duplex Bluetooth transmission tire pressure system according to claim 1, wherein the monitoring module includes a pressure monitoring unit, a temperature monitoring unit, a gravity monitoring unit and a voltage monitoring unit.

3. The duplex Bluetooth transmission tire pressure system according to claim 1, wherein when the transceiver host controls the control unit by Bluetooth to operate the tire condition program and limit transmitting the data of the monitoring module, the control unit transmits the packet to the transceiver host when data from the monitoring module compared to the default value of the tire condition program shows an abnormal state.

4. The duplex Bluetooth transmission tire pressure system according to claim 1, wherein the transceiver host controls the locating program and the tire condition program of the control unit via Bluetooth to operate simultaneously.

5. The duplex Bluetooth transmission tire pressure system according to claim 1, wherein the transceiver host controls the locating program of the control unit to operate first, and then the tire condition program of the control unit starts after the operation of the locating program is finished.

6. A method for duplex Bluetooth detecting tire pressure, comprising starting a vehicle;

a transceiver host transmits a Bluetooth controlling packet to a Bluetooth tire pressure detector to start a locating program;

a monitoring module of the Bluetooth tire pressure detector detects the tire rotating and generates a Bluetooth locating packet;

the Bluetooth tire pressure detector transmits the Bluetooth locating packet to the transceiver host;

the transceiver host receives the Bluetooth locating packet till the locating is finished;

the transceiver host transmits the Bluetooth controlling packet to the Bluetooth tire pressure detector to stop the locating program and start the tire condition program;

the monitoring module of the Bluetooth tire pressure detector detects the tire rotating and generates a Bluetooth tire condition packet;

the Bluetooth tire pressure detector transmits the Bluetooth tire condition packet to the transceiver host.

7. The method for duplex Bluetooth detecting tire pressure according to claim 6, wherein when the transceiver host controls the control unit by Bluetooth to operate the tire condition program and limit transmitting the data of the monitoring module, the control unit transmits the packet to the transceiver host when data from the monitoring module compared to the default value of the tire condition program shows an abnormal state.

8. A method for duplex Bluetooth detecting tire pressure, comprising:

starting a vehicle;

a transceiver host transmits a Bluetooth controlling packet to a Bluetooth tire pressure detector to start a locating program and a tire condition program;

the Bluetooth tire pressure detector detects the tire rotating and generates a Bluetooth locating packet and a Bluetooth tire condition packet;

the Bluetooth tire pressure detector transmits the Bluetooth locating packet and the Bluetooth tire condition packet to the transceiver host;

the transceiver host receives the Bluetooth locating packet till the locating is finished;

a transceiver host transmits a Bluetooth controlling packet to a Bluetooth tire pressure detector to stop a locating program.

9. The method for duplex Bluetooth detecting tire pressure according to claim 8, wherein when the transceiver host controls the control unit by Bluetooth to operate the tire condition program and limit transmitting the data of the monitoring module, the control unit transmits the packet to the transceiver host when data from the monitoring module compared to the default value of the tire condition program shows an abnormal state.

\* \* \* \* \*